US012276134B2

(12) United States Patent
Alizadehbirjandi et al.

(10) Patent No.: US 12,276,134 B2
(45) Date of Patent: *Apr. 15, 2025

(54) SECURE ENCLOSURE EMERGENCY ACCESS MECHANISM

(71) Applicant: CareFusion 303, Inc., San Diego, CA (US)

(72) Inventors: Elaheh Alizadehbirjandi, Mountain View, CA (US); Mustafa Yusufi, Escondido, CA (US); Michael K. Rahilly, Encinitas, CA (US); Bob Reents, San Diego, CA (US); Thi Q. Ho, San Diego, CA (US)

(73) Assignee: CareFusion 303, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/419,051

(22) Filed: Jan. 22, 2024

(65) Prior Publication Data

US 2024/0159082 A1 May 16, 2024

Related U.S. Application Data

(63) Continuation of application No. 17/728,884, filed on Apr. 25, 2022, now Pat. No. 11,913,251.

(Continued)

(51) Int. Cl.

| | |
|---|---|
| ***E05B 45/06*** | (2006.01) |
| ***E05B 47/00*** | (2006.01) |
| ***G07C 9/00*** | (2020.01) |

(52) U.S. Cl.

CPC .......... *E05B 45/06* (2013.01); *E05B 47/0001* (2013.01); *G07C 9/00571* (2013.01);

(Continued)

(58) Field of Classification Search

None

See application file for complete search history.

(56) References Cited

U.S. PATENT DOCUMENTS

| | | | |
|---|---|---|---|
| 8,922,333 | B1 | 12/2014 | Kirkjan |
| 9,551,168 | B2 | 1/2017 | Dias |

(Continued)

FOREIGN PATENT DOCUMENTS

| | | | |
|---|---|---|---|
| EP | 3367341 | A1 | 8/2018 |
| WO | WO-2019068021 | A1 | 4/2019 |
| WO | WO-2020264434 | A1 | 12/2020 |

*Primary Examiner* — K. Wong

(74) *Attorney, Agent, or Firm* — Morgan, Lewis & Bockius LLP

(57) ABSTRACT

A latch is configured to be affixed to an inner portion of a door to an enclosure and to engage a catch attached to an inner portion of the enclosure when the door is in a closed position/ A housing is affixed to an outer portion of the door and includes a memory device and a latch controller configured to detect when the latch is no longer within a proximity of the catch. The controller is configured to electronically open the latch to open the access door. The housing also includes an emergency access portal aligned with and providing access through the access door by an instrument to at least the catch to engage the catch and release the access door. The latch controller detects that the latch is no longer within the predetermined proximity of the catch and registers the opening of the latch in the memory device.

20 Claims, 12 Drawing Sheets

Related U.S. Application Data

(60) Provisional application No. 63/179,997, filed on Apr. 26, 2021.

(52) U.S. Cl.
CPC . *E05B 2045/063* (2013.01); *E05B 2045/0665* (2013.01); *E05B 2045/0695* (2013.01); *E05B 2047/0058* (2013.01)

(56) References Cited

U.S. PATENT DOCUMENTS

| | | | | |
|---|---|---|---|---|
| 11,913,251 | B2 * | 2/2024 | Alizadehbirjandi | .... E05B 45/06 |
| 2019/0048621 | A1 | 2/2019 | Gerhardt et al. | |
| 2020/0410801 | A1 | 12/2020 | Rahilly | |

* cited by examiner

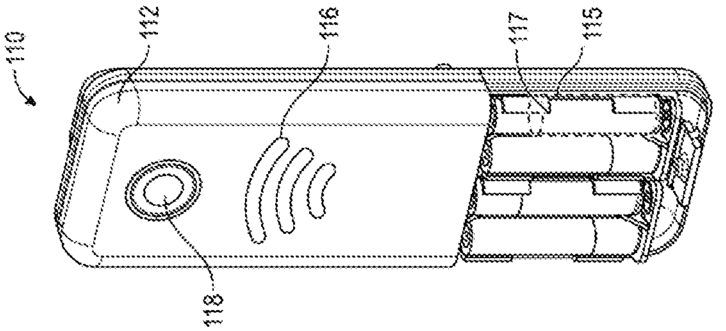
FIG. 5
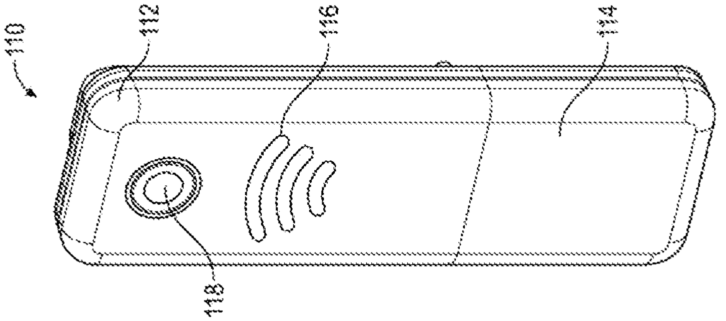
FIG. 4
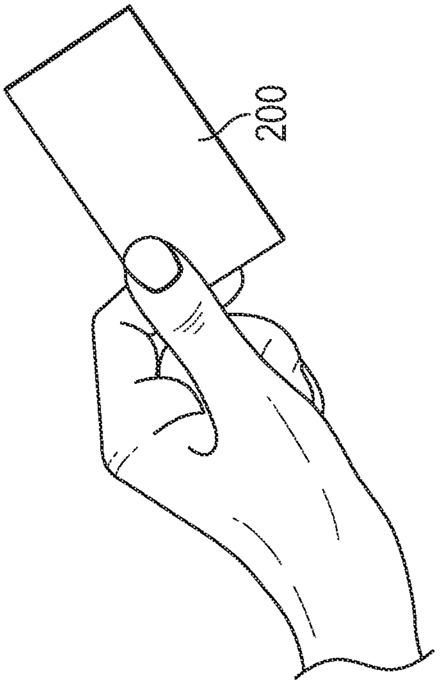

SECURE ENCLOSURE EMERGENCY ACCESS MECHANISM

CROSS-REFERENCE TO RELATED APPLICATION

This application is a continuation of U.S. application Ser. No. 17/728,884, filed on Apr. 25, 2022, now U.S. Pat. No. 11,913,251, which claims the benefit of U.S. Provisional Application No. 63/179,997, filed on Apr. 26, 2021, the entirety of each of which is incorporated herein by reference.

FIELD OF THE INVENTION

The present disclosure generally relates to secure storage.

BACKGROUND

Medications and other regulated products are often required to be stored in secured storage and dispensing mechanisms. Often, an automated dispensing cabinet (ADC) is used to control access to regulated products. ADCs are often expensive and occupy significant space.

In some settings, existing enclosed space such as drawers, cabinets, and carts are used to store and dispense medications. However, some of these enclosed spaces may lack of security and traceability, and those spaces that do have these features may be resource intensive to manage. Moreover, access to these enclosed spaces may be needed in emergency situations, without the appropriate credentials.

Accordingly, there is a need for improved systems and methods of providing access control to enclosures, particularly within clinical settings.

SUMMARY

The disclosed subject matter relates to secure medication storage. According to various implementations, a access control system includes a catch configured to be affixed to an inner portion of an enclosure, a latch configured to engage the catch when the catch is attached to the enclosure and an access door of the enclosure is in a closed position, wherein the latch engaging the catch secures the access door of the enclosure in a locked state, a memory device, one or more sensors configured to monitor the catch, an actuator configured to electronically open the latch to open the access door of the enclosure, a latch controller, a credential interface configured to receive an electronically provided credential, and a communication interface configured to communicate with a server over an electronic network. In such implementations, the latch controller is configured to detect, using the one or more sensors, when the latch is within a predetermined proximity of the catch, and responsive to detecting that the latch is not within the predetermined proximity of the catch, determine whether an authorized credential was received via the communication interface to open the latch, and when the authorized credential was received, register an authorized opening of the latch in the memory device, and when the authorized credential was not received, register the unauthorized opening of the latch in the memory device and enter an alert state. Other aspects include corresponding systems, methods, apparatuses, and computer program products for implementation of the access control system.

According to various implementations, a access control assembly attachable to a door of an enclosure is disclosed. The access control assembly includes a latch configured to engage a catch affixed to an inner portion of the enclosure when the access control assembly is attached to the door of the enclosure, wherein the latch engaging the catch secures the door in a locked state, an actuator configured to electronically open the latch to open the door of the enclosure, a credential interface configured to receive an electronically provided access credential, and a communication interface configured to communicate with a server over an electronic network. In such implementations, a latch controller of the access control assembly is configured to receive the access credential from the communication interface, responsive to receiving the access credential, store an indication of the access credential in the memory device, query the server over the electronic network as to whether the access credential is authorized to access the enclosure, trigger the actuator to open the latch when the server indicates the access credential is authorized to access the enclosure, and when the server indicates the credential is not authorized to access the enclosure or when the communication interface is unable to communicate with the server to authorize the credential: require a secondary credential to access the enclosure, receive the secondary credential to access the enclosure, trigger the actuator to open the latch based on receiving the secondary credential, store, in the memory device, a record of the latch being opened together with the secondary credential, and provide the record to the server at a next time the communication interface communicates with the server. Other aspects include corresponding systems, methods, apparatuses, and computer program products for implementation of the access control assembly.

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 4 is a perspective view of an interface module for use with the cabinet enclosure of FIG. 1, according to various aspects of the subject technology.

FIG. 5 is a perspective view of the interface module of FIG. 4 with a lower cover removed, according to various aspects of the subject technology.

DETAILED DESCRIPTION

Access Control Assemblies

The disclosed access control assembly incorporates a latching module with integrated "smart" processing to control access to inventory. The latching module can engage and disengage a latching member to control access to a storage volume. The access control assembly module can authenticate users and control the actuation of the latching member, and is configurable to provide emergency access in emergency situations, particularly when network problems prevent credentials from being authenticated in a timely manner.

The disclosed access control assembly module overcomes several challenges discovered with respect to certain conventional secure medication storage devices. One challenge with certain conventional storage devices is that certain conventional storage devices may not trace users that accessed sensitive inventory such as a medication. Further, certain conventional storage devices may default to an unlocked state upon depletion of the batteries. Additionally, certain conventional devices may be cumbersome and occupy large amounts of space. It may also be desirable to quickly augment existing storage locations with "smart" devices to improve storage and inventory capabilities.

In accordance with the present disclosure, it is advantageous to provide access control assemblies as described herein that allow for traceable, space efficient, and secure storage of regulated products, such as medication. The disclosed access control assemblies provide space efficient and secure storage of medication.

Examples of access control assemblies that allow for secure storage are now described.

Figure 1:
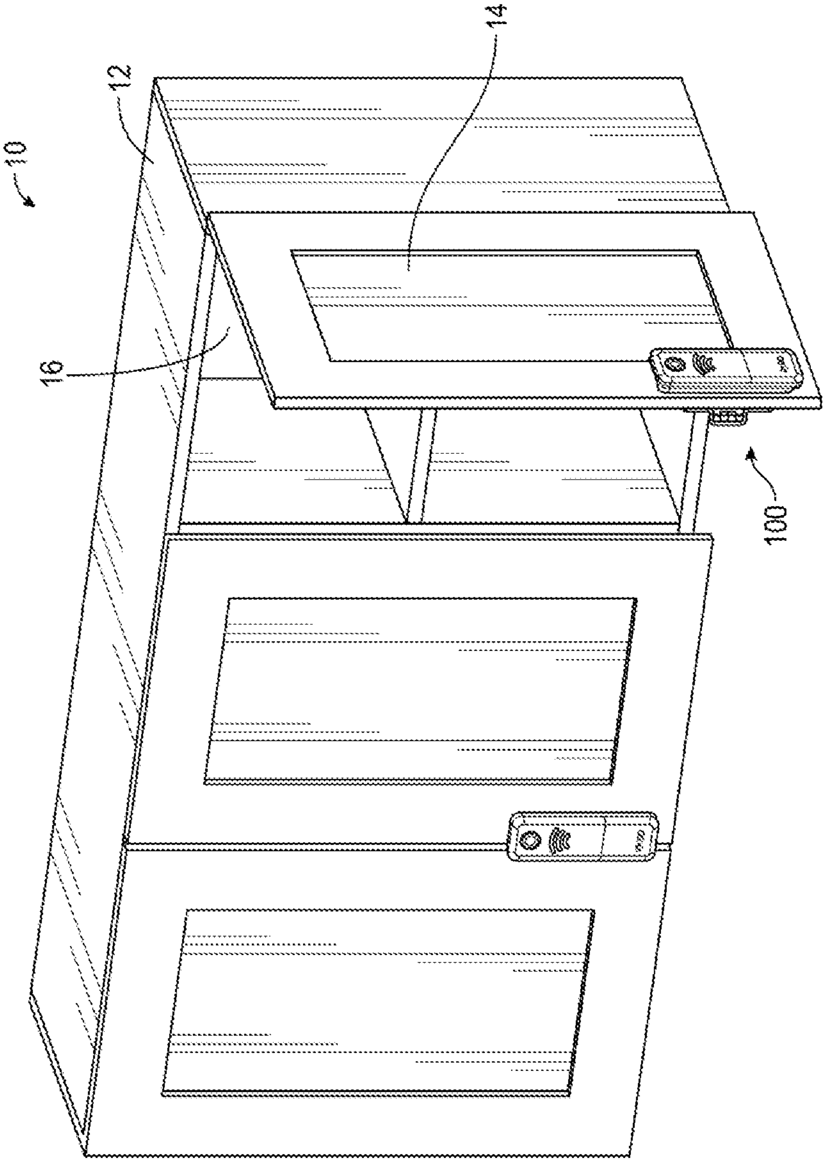
FIG. 1 is a perspective view of a cabinet enclosure, in accordance with various aspects of the subject technology.

FIG. 1 is a perspective view of a cabinet enclosure 10, in accordance with various aspects of the subject technology. With reference to FIG. 1, the cabinet 10 in conjunction with the access control assembly 100 can provide secure item storage and retrieval.

As illustrated, the cabinet 10 can allow for the storage of inventory within a cabinet volume 16 defined by the cabinet body 12. As can be appreciated, the cabinet volume 16 can securely store items such as medication or other regulated products. In the depicted example, the cabinet volume 16 can be accessed by opening a cabinet door 14. Access to the cabinet volume 16 and items stored therein can be prevented by closing the cabinet door 14. The cabinet door 14 can be movably coupled to the cabinet body 12 by one or more hinges.

As described herein, the cabinet 10 can include an access control assembly 100 (a access control assembly system) to control access into the cabinet volume 16. The access control assembly 100 can lock the cabinet door 14 to the cabinet body 12 to prevent access into the cabinet volume 16 and items stored therein. During operation, the cabinet door 14 can be unlocked or otherwise released upon authentication of a user. The access control assembly 100 can be mounted opposite to the hinges of the cabinet door 14. In some applications, the access control assembly 100 can be added or retrofitted to existing cabinet doors 14 to add access control to existing cabinets 10. In some applications, cabinets 10 can include the access control assembly 100 upon original manufacture or assembly.

Figure 2:
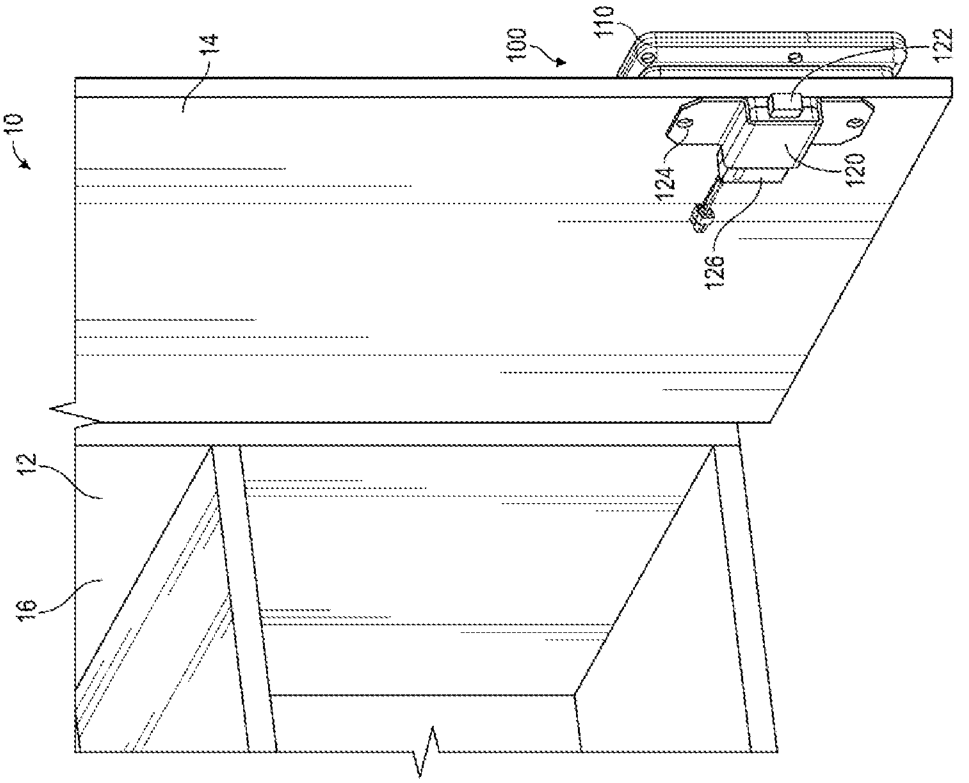
FIG. 2 is a perspective view of the cabinet enclosure of FIG. 1 with a cabinet door in an open position, according to various aspects of the subject technology.
Figure 3:
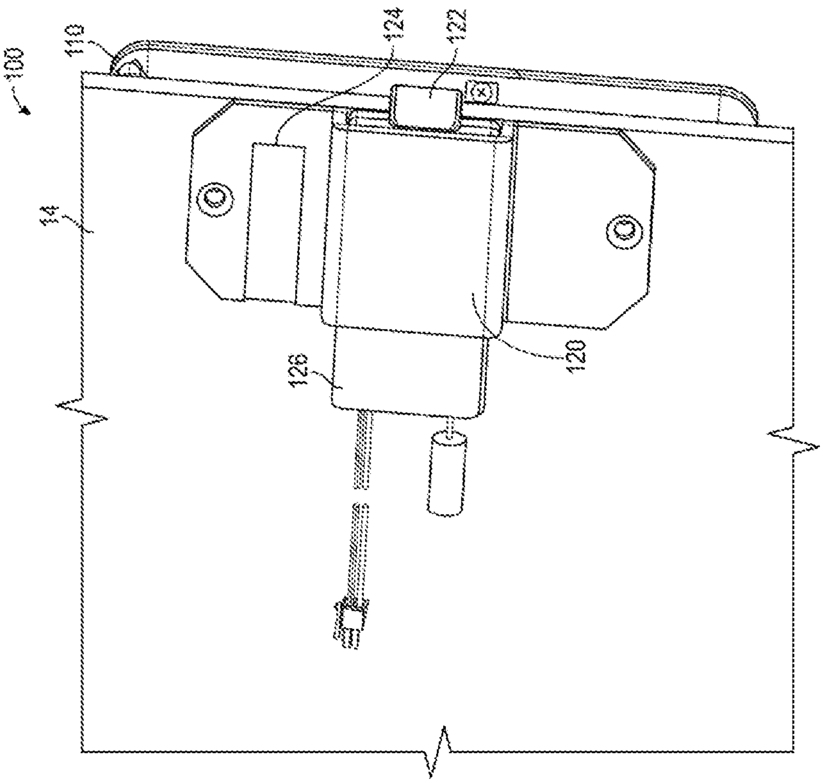
FIG. 3 is a reverse perspective view of the cabinet door of FIG. 2, according to various aspects of the subject technology.

FIG. 2 is a perspective view of the cabinet enclosure 10 of FIG. 1 with a cabinet door 14 in an open position, according to various aspects of the subject technology. FIG. 3 is a reverse perspective view of the cabinet door 14 of FIG. 2, according to various aspects of the subject technology. With reference to FIGS. 2 and 3, the access control assembly 100 includes an interface module 110 and a latching module 120 coupled to the cabinet door 14.

In the depicted example, the interface module 110 can control the operation of the latching module 120, allowing a user to gain access to the cabinet volume 16. The interface module 110 can authenticate user inputs and send or display a message, or provide feedback or information, to the user. The interface module 110 can be mounted to an outer surface of the cabinet door 14. In some implementations, the interface module 110 can be mounted to the cabinet door 14 using existing mounting points for conventional handles.

In the depicted example, the latching module 120 locks and unlocks the cabinet door 14 with the cabinet body 12. As illustrated, the latching module 120 is coupled to an inner surface of the cabinet door 14. In some implementations, the latching module 120 is mounted opposite to the interface module 110. A mounting bracket 124 can secure the latching module 120 to the cabinet door 14. Optionally, the latching module 120 can be mounted to the cabinet door 14 using the existing mounting points for conventional handles. In some implementations, the latching module 120 can be secured to the cabinet door 14 by the same fasteners securing the interface module 110.

In an unlocked state, the latching module 120 can allow the cabinet door 14 to be freely opened and closed. The latching module 120 can retract a latching member 122 to prevent the latching member 122 from engaging with the cabinet body 12. The latching member 122 can be moved or actuated by an actuator 126. While in the depicted example, the latching module 120 is orientated laterally (e.g. towards a side of the enclosure), various implementations include the latching module 120 orientated in a vertical direction with the latching member 122 engaging a catch on the lower surface of the cabinet body 12. The actuator 126 may be configured to provide linear or rotational actuation using electric, magnetic, or mechanical power to move the latching member 122.

In a locked state, the latching module 120 can retain the cabinet door 14 in a closed position. The latching module 120 can extend the latching member 122 to engage against a portion of the cabinet body 12. The latching member 122 can engage against a frame or catch portion of the cabinet body 12. The latching member 122 can be moved or actuated by the actuator 126. As can be appreciated, the actuator 126 can be controlled by the interface module 110. Actuator 126 is configured to electronically open the latch to open the access door of the enclosure.

Figure 6:
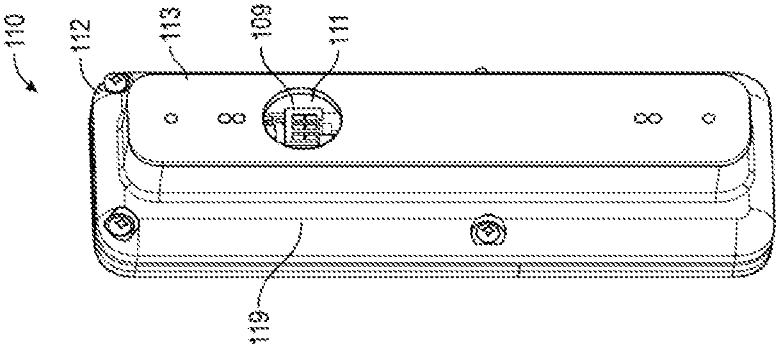
FIG. 6 is a reverse perspective view of the interface module of FIG. 4, according to various aspects of the subject technology.

FIG. 4 is a perspective view of an interface module 110 for use with the cabinet 10 of FIG. 1, according to various aspects of the subject technology. FIG. 5 is a perspective view of the interface module 110 of FIG. 4 with a lower cover 114 removed, according to various aspects of the subject technology. FIG. 6 is a reverse perspective view of the interface module 110 of FIG. 4, according to various aspects of the subject technology. With reference to FIGS. 4-6, the interface module 110 can control the operation of the latching module 120 by preventing access by unauthorized users and permitting access for authorized users.

In the depicted example, the interface module 110 is operatively coupled to the latching module 120. The access control assembly system 100 (or access control assembly control assembly 100) includes a catch (not shown) configured to be affixed to an inner portion of the corresponding enclosure, the latch member 122 is configured to engage the catch when the catch is attached to the enclosure and the access door 14 of the enclosure is in a closed position. In this regard, the latch member engages the catch and secures the access door 14 in a locked state.

In some implementations, a connector 109 can provide an interface between the interface module 110 and the latching module 120. A cable can pass through a port 111 formed in the body 112 to engage with the connector 109. In some implementations, the cable can pass through a hole in the cabinet door 14 to allow direct communication between the interface module 110 and the latching module 120 disposed on opposite sides of the cabinet door 14. In some implementations, interface module 110 may communicate with latching module 120 via a short range wireless connection (e.g. using BLUETOOTH).

In some implementations, the interface module 110 can function as an authentication device, can be used to direct and control access to the cabinet 10. A sensing portion 116 functions as a credential interface configured to receive an electronically provided credential. In some implementations, cabinets 10 can be accessed using a personal computer, a tablet computer, a smartphone, a barcode reader, and/or a biometric reader via the interface module 110. During operation, the interface module 110 can provide a plurality of user authentication methods (biometric, smartcard, password, barcode, ECG based wearable device, mobile phone, etc.), allowing the user to select one or more of the authentication methods. The selection may be a user specific configuration, site-specific configuration (e.g., all users at a given site will be authenticated according to the selected method(s)), or system-wide configuration (e.g., all users of the system will be authenticated according to the selected method(s)). Sensing portion 116 is configured to detect user inputs, such as biometrics, near field communication, smartcard, password, barcode, ECG based wearable device, mobile phone, etc. The interface module 110 can utilize any suitable personal area network (PAN) protocols, such as 802.15.4 or BLUETOOTH, or other short-range compatible wireless communication protocol, to communicate with remote devices. In some implementations, the use of PAN protocols can avoid integration with existing networks, simplifying installation.

Some embodiments provide that remote authentication methods can be implemented to allow a super user to grant remote authorization (e.g., if a user loses their badge or smart phone or other authentication device). In the event of loss of connectivity with the access control assembly, including but not limited to unexpected network failure or gateway/hub/tablet device malfunction, a user can scan a master badge 200 directly on the interface module 110 to unlock the device and access the cabinet. According to various implementations, interface module 110 and/or latching module 120 includes a memory device and a latch controller (e.g. a processor), for example on a main board within interface module 110. An identifier of authorized master badge may be stored in the memory device and used to verify master badge 200 when scanned. The master badge may be associated with a limited duration of use (e.g., number of times the badge can be used for access, frequency of use for access, or other configurable measure). The duration may be configured or reset such as by an administrator using a tablet device.

As will be described further, interface module 110 may include a communication interface configured to communicate with a server over an electronic network. Use of a master badge 200 becomes tamper evident as upon using the master badge 200, an access event is captured and flagged in an internal memory device of interface module 110 or latching module 120. IDN, admins, and authorized personnel will be notified of this access via the network. Also, in the event that batteries 117 are removed from the access control assembly, the master badge access may still be functional using a rechargeable battery or other power storage (e.g. super capacitor) on a main board within interface module 110, and the event will be captured. Capturing the event may include storing a record in a memory of one or more of: the event occurring, a type for the event, or time information indicating when the event occurred, or other information detected at or by the access control assembly when a master badge is used for access.

In any embodiment, data generated or detected can be forwarded to a "remote" device or location, where "remote," means a location or device other than the location or device at which the program is executed. For example, a remote location could be another location (e.g., office, lab, etc.) in the same city, another location in a different city, another location in a different state, another location in a different country, etc. As such, when one item is indicated as being "remote" from another, what is meant is that the two items can be in the same room but separated, or at least in different rooms or different buildings, and can be at least one mile, ten miles, or at least one hundred miles apart. "Communicating" information references transmitting the data representing that information as electrical signals over a suitable communication channel (e.g., a private or public network). "Forwarding" an item refers to any means of getting that item from one location to the next, whether by physically transporting that item or otherwise (where that is possible) and includes, at least in the case of data, physically transporting a medium carrying the data or communicating the data. Examples of communicating media include radio or infra-red transmission channels as well as a network connection to another computing or networked device, and the internet or including email transmissions and information recorded on websites and the like.

The user's authenticated identity can be transmitted to a server to request authorization to access a particular medication or item stored in a respective cabinet 10. Upon receiving authentication, the cabinet 10 can be identified and/or unlocked by retracting the latching member 122 of the latching module 120. In some implementations, authentication can proceed in an offline mode, allowing the user to proceed without network connectivity. In some implementations, the authentication device can provide an audible signal (for example from a piezo beeper) to indicate registration of user actions. Optionally, the interface module 110 can trace user access attempts, time of access, date of access, type of medication accessed, etc.

In some implementations, the interface module 110 and/or latching module 120 can include a position or acceleration sensor to determine if the cabinet door 14 is in an open or closed position. In some implementations, the interface module 110 can either sense or record the position of the latching member 122 to determine if the latching member 122 is in a locked or unlocked position.

Sensors included in the interface module 110 or latching module 120 may include one or more sensors to record, for example, environmental conditions and evidence related to attempts to divert or tamper with the contents of the cabinet. For example, a load sensor may comprise a load cell that can measure the mass of items contained in the cabinet, which can be used to estimate changes in item quantities. A shock and vibration sensor may help to identify unauthorized access attempts to the cabinet using force. A tamper sensor may determine whether intrusion has occurred or if the cabinet has been removed from a fixture, for example if retaining screws, containers, covers, or other components of cabinet have been opened, unsealed, drilled, deformed, or otherwise tampered. For example, mechanical switches, anti-tamper films, photodiodes with reflective materials, infrared proximity sensors, and other devices may be used. A location sensor may include, for example, a global positioning system (GPS) radio to enable location history tracking. Alternatively, or additionally, in some implementations, triangulation may be used to determine location, for example by using Wi-Fi or Bluetooth triangulation using known networks and/or hubs.

In some implementations, the interface module 110 can include a status indicator 118. The status indicator 118 can display a plurality of colors at various intensities and flash patterns to provide a status of the interface module 110. As can be appreciated, the status indicator 118 can provide different visual indicators based on an identified user and workflow. For example, if a tamper was detected or master badge 200 was used to access cabinet 10 then the status indicator 118 may flash red, or if the battery level of the interface module 110 is low then the status indicator 118 can provide a low battery signal. In some implementations, the status indicator 118 includes one or more LED's driven by a FET based drive circuitry. In some implementations, the interface module 110 can utilize an audio indicator to provide the foregoing alerts.

In some implementations, the interface module 110 can be powered by disposable or rechargeable batteries 117. As illustrated, the batteries 117 can be inserted into a battery compartment 115 defined at the front of the body 112. A lower cover 114 can cover the battery compartment 115. As can be appreciated, the battery compartment 115 can be accessed from the exterior of the cabinet 10, allowing the batteries 117 to be replaced without unlocking the cabinet 10 or requiring access to the interior of the cabinet 10. In contrast, conventional access control systems may have batteries that are accessed from the interior of a storage area, requiring conventional access control systems to unlock at a low state of charge to facilitate replacement of the batteries. Advantageously, by locating the battery compartment 115 at an exterior accessible location, the cabinet 10 can remain locked when the batteries are at a low state of charge or depleted, permitting the cabinet 10 to remain secured until the batteries 117 are changed. As will be described further, battery compartment 115 may provide access to an emergency release mechanism to allow unlocking of the latching member when access cannot be achieved, for example when interface module 110 is unable to connect to a network to authenticate the user.

In some implementations, the interface module 110 can utilize one or more power conservation methods. Methods can include placing devices in various low power states to wake up periodically (wake up period), enabling radio communications, checking in with a gateway/hub for updates or to perform transactions. Power saving states can adjust device responsiveness in balance with power savings or low power states. The wake up period can be configured by the gateway/hub for devices based on system usage factors and user preferences. Power states can be adjusted based on user presence, such as if users are present, then devices are placed in more responsive states in anticipation of the system being used. If users are not present the devices are put in less responsive states to maximize power savings.

In some implementations, the system can harvest energy to increase the operational life of the system. For example, the system can include piezo transducers interfaced to buttons, and/or electromagnetic inductors to harvest energy from the opening or closing of the cabinet doors. Wireless energy can be harvested from RF sources.

In some implementations, the interface module 110 can communicate with other interface modules 110. In the depicted example, the interface module 110 can wirelessly communicate with other control systems. Optionally, the interface module 110 can include a beacon for tamper detection and/or monitoring, including real time and offline mode support. The interface module 110 can include tamper resistance features.

Figure 7:
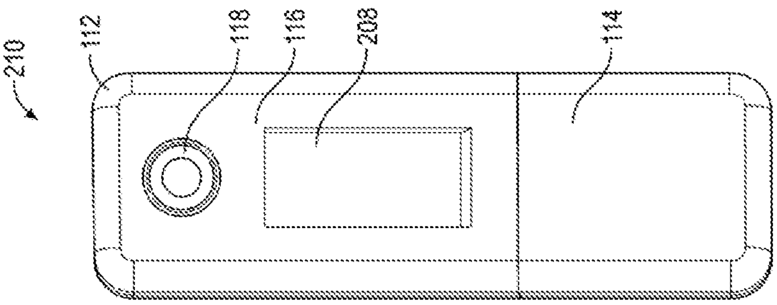
FIG. 7 is a front view of an interface module for use with the cabinet of FIG. 1, according to various aspects of the subject technology.

FIG. 7 is a front view of an interface module 210 for use with the cabinet 10 of FIG. 1, according to various aspects of the subject technology. Optionally, the interface module 210 can include a display 208, such as an e-ink display. The display 208 can display information about the contents of a respective cabinet or its access requirements. In some implementations, the display functions as a status indicator 118. The display may be controlled by an interface module specific microcontroller. In some implementations, the control may be achieved using a control message from a remote server such as an inventory management server.

Figure 8B:
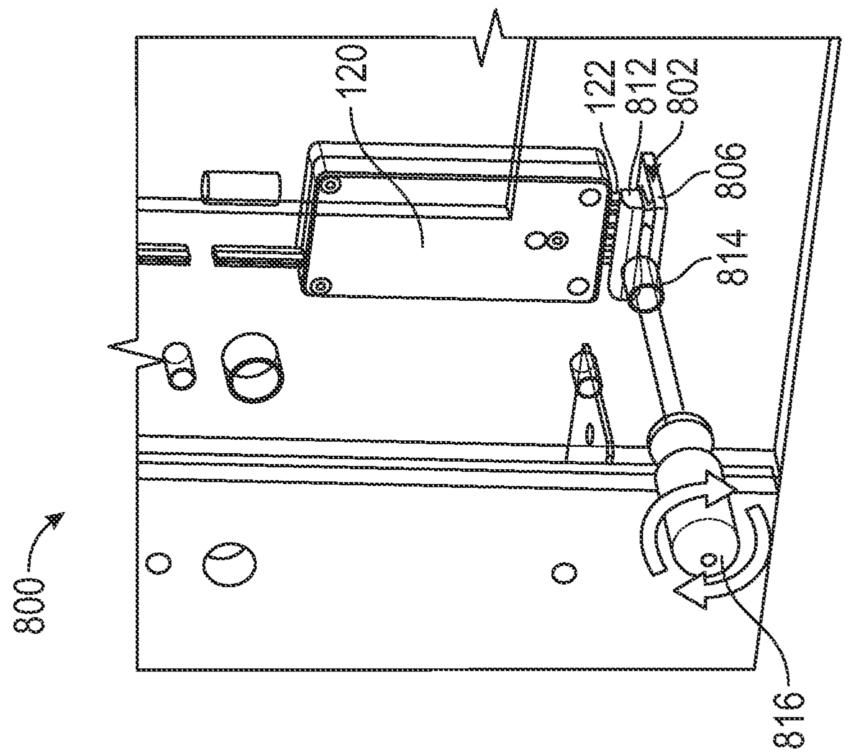
FIGS. 8A and 8B depict a front and rear view, respectively, of an example access control assembly system, including a first example emergency access mechanism, according to various aspects of the subject technology.
Figure 8A:
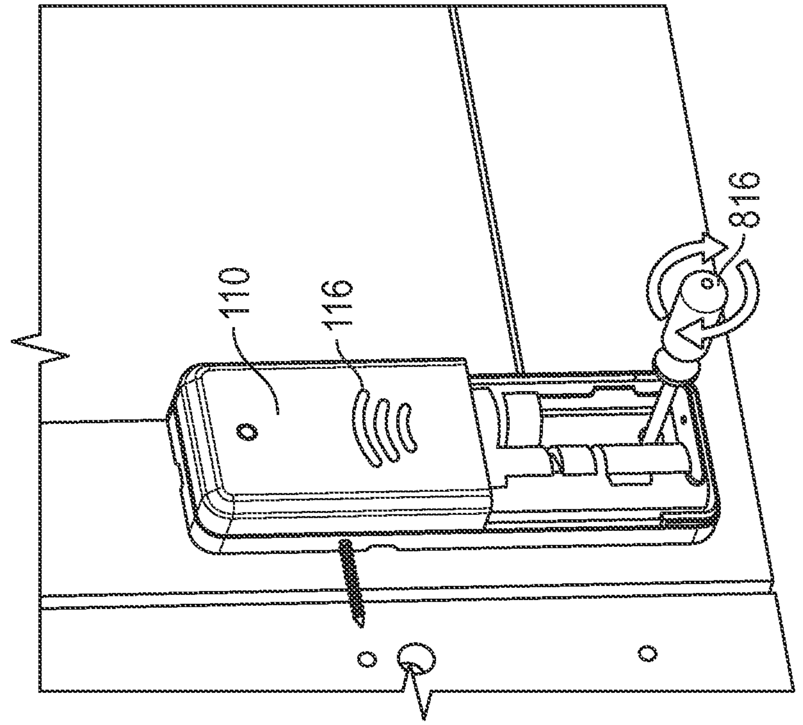

FIGS. 8A and 8B depict a front and rear view, respectively, of an example access control assembly system, including a first example emergency access mechanism, according to various aspects of the subject technology. A access control assembly system 800 includes a catch 802 (shown more directly in FIGS. 9A to 9C) configured to be affixed to an inner portion of an enclosure 10 (e.g. a cabinet). Latch 122 is configured to engage the catch 802 when the catch is attached to the enclosure and an access door 14 of the enclosure is in a closed position.

Latch 122 engaging the catch secures the access door of the enclosure in a locked state. In various implementations, the access control assembly system 800 is configured to detect, using the one or more sensors (not shown), when the latch is within a predetermined proximity of the catch 802. Responsive to detecting that the latch is not within the predetermined proximity of the catch, a latch controller (e.g. a processor) of system 800 may determine whether an authorized credential was received via the communication interface 116 to open the latch. When the authorized credential was received, the processor may register an authorized opening of the latch in the memory device within interface module 110 or latching module 120, and when the authorized credential was not received, register the unauthorized opening of the latch in the memory device in the memory device and enter an alert state.

Figure 9C:
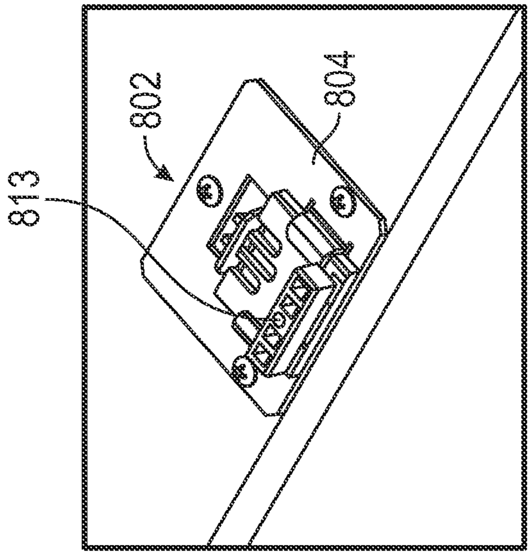
FIGS. 9A to 9C depict an example breakaway catch, according to various aspects of the subject technology.
Figure 9B:
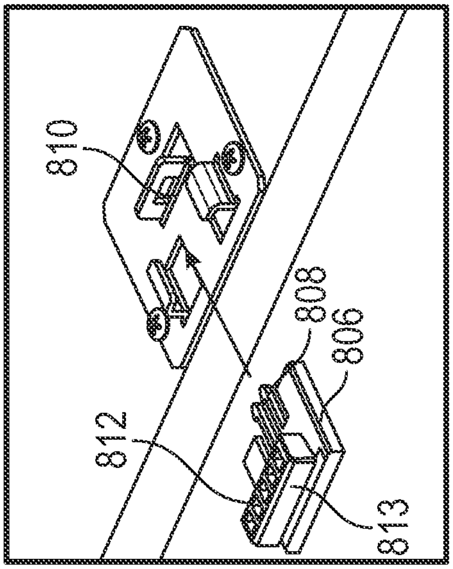
Figure 9A:
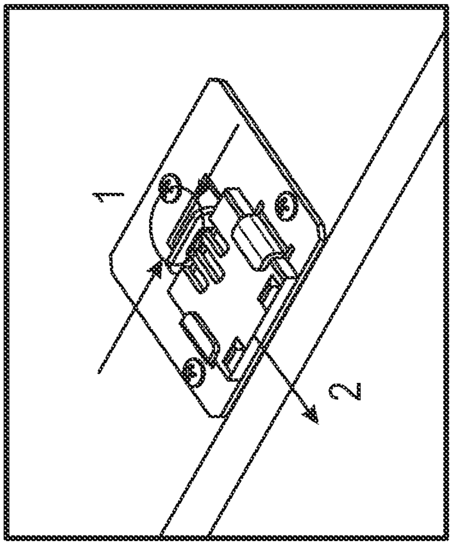

FIGS. 9A to 9C depict an example breakaway catch, according to various aspects of the subject technology. According to various implementations, catch 802 may include an anchor portion 804 and a breakaway catch module 806. As in the depicted examples, breakaway catch module 806 is insertable into anchor portion 804 where it locks in place. The breakaway catch module 806 may include a squeeze clasp 808 which locks into a fastening inlet 810 of anchor portion 804. In this regard, FIG. 9B depicts insertion and locking of the breakaway catch module into anchor portion 804. Anchor portion 804 is configured to be affixed to the inner portion of the enclosure 10 and breakaway catch module 806 is configured to interface with the latch 122, as indicated in FIG. 8B, to secure the access door 14 of the enclosure 10 in the locked state. As will be described further, catch module 806 may include a breakaway portion 812 that, when broken away from catch module 806 releases latch 122.

With reference back to FIGS. 8A and 8B, interface module 110 or latching module 120 may include an emergency access portal 814 through a portion of the housing of interface module 110 (and access door 14). The emergency access portal 14 provides access by an instrument 816, such as a flathead screwdriver, to the catch 802 to detach the breakaway portion 812 from the catch module 806 (and thus from anchor portion 804). Detaching the breakaway portion 812 from the anchor portion releases access door 14 to provide access to the enclosure. According to various implementations, this step also triggers one or more sensors (not shown) within interface module 110 or latching module 120 to detect that the latch 122 is no longer within the predetermined proximity of the catch 802, 806.

As shown in FIG. 8A, the emergency access portal 814 may be located within the battery compartment of interface module 110. According to some implementations, interface module 110 may include a sensor configured to detect access to the battery compartment 115. In this regard, system 800 may be further configured to, when the battery compartment 115 is accessed, register the access to the battery compartment 115 in the memory device and enter the alert state.

In the event of hardware malfunction including but not limited to badge reader issue, latch failure, and board malfunction, the user may be advised to access battery compartment 115 by removal of the battery cover, remove the batteries 117, place a flathead screwdriver 816 into the emergency access opening 814 in the device, and turn the screwdriver clockwise for 90 degrees. By doing so, the user will break the catch 806 and unlock the device in order to access the cabinet. A sensor reader within latching module 120 no longer detects a proximity device 813 (described below) inside the catch and flags and captures this event as emergency access (powered up via the internal rechargeable battery on the main board) and a notification is sent to a server, an administrator, and previously identified authorized personnel.

With reference to FIGS. 9B and 9C, catch module 806, or breakaway portion 812 may include a ferrous or magnetic object 813 embedded therein. Latching module 120 may include a magnetic sensor (not shown) near or embedded within latch 122 that is configured to detect object 813 when the latch 122 is engaged with catch 806. Additionally, a depicted in the examples, catch 806 may include a plurality of slits (or holes), and the ferrous or magnetic object 813 may be embedded within one or more of the slits. In some implementations, latch member 122 may include a plurality of teeth that engage within the plurality of slits to engage the catch 806 and lock door 14 in the closed or secured position. To replace the broken catch 806, an admin or authorized personnel may remove the remaining piece of the broken catch out of the bracket 804 (FIG. 9A) and simply insert the new catch in. The access control assembly system 100 may then automatically detect the new catch and proceed to normal operations.

Figure 10B:
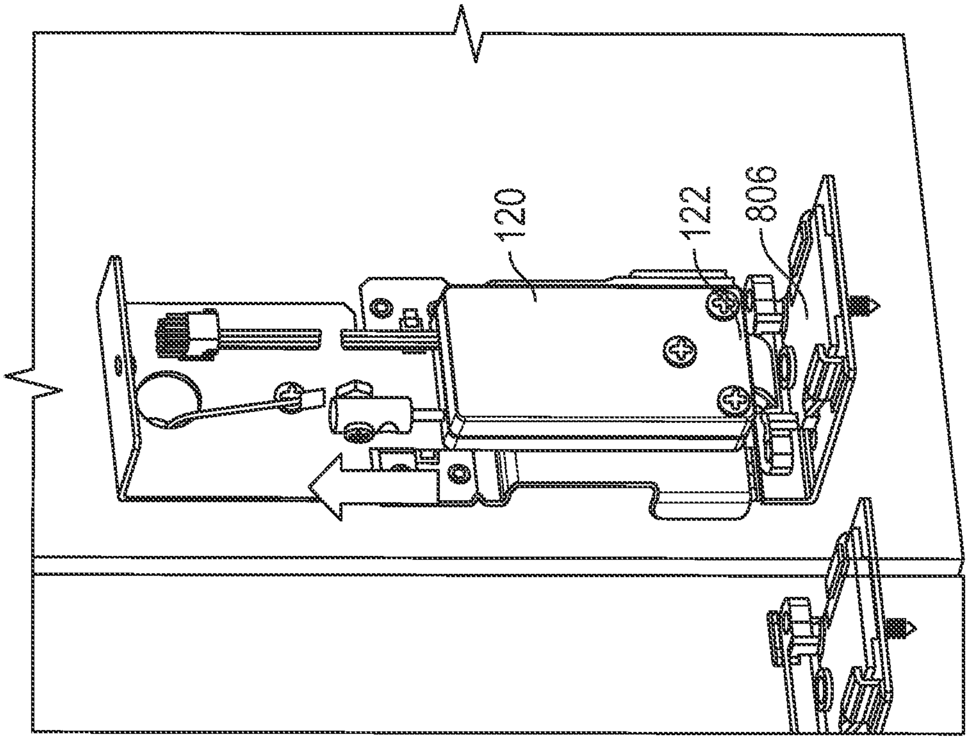
FIGS. 10A and 10B depict a front and rear view, respectively, of an example access control assembly system, including a second example emergency access mechanism, according to various aspects of the subject technology.
Figure 10A:
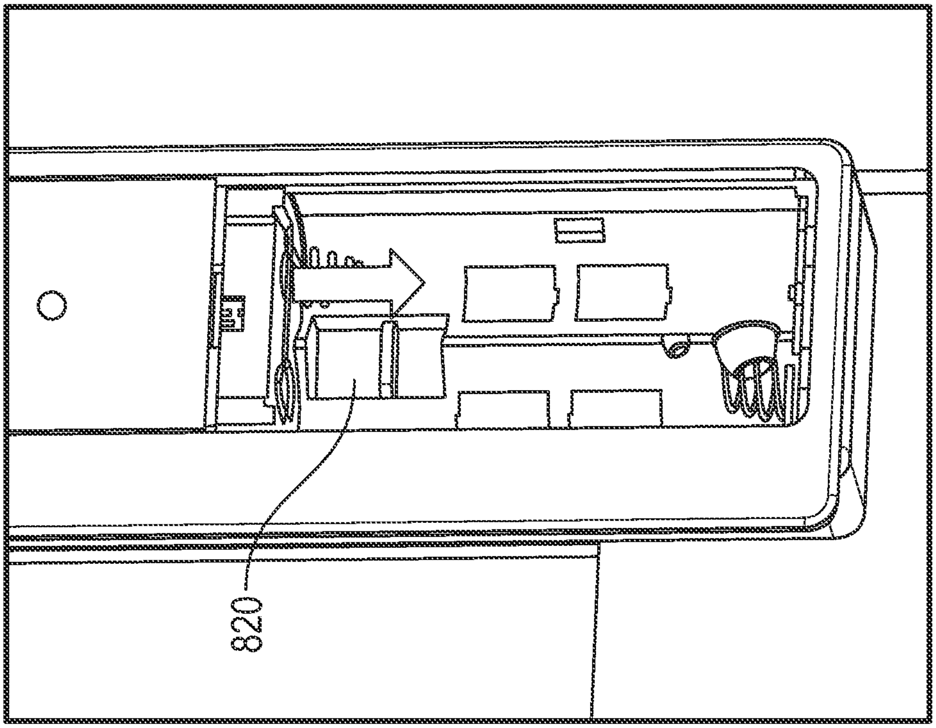

FIGS. 10A and 10B depict a front and rear view, respectively, of an example access control assembly system, including a second example emergency access mechanism, according to various aspects of the subject technology. In the depicted embodiment, instead of using an instrument 816 to breakaway part of catch 806, an emergency access portal may include access to a mechanical lift trigger 820 configured to manually lift a lift latching module 120 which, in turn, is configured to move the latch 122 away from the catch 806. In the depicted implementation, pulling down on lift trigger 802 (FIG. 10A) may cause latching module 120 (or portion thereof) to lift away from catch 806 (FIG. 10B). In some implementations, pulling up on lift trigger 802 may cause latching module 120 to lift away from catch 806. In either case, movement of lift trigger 820 may release the access door to provide access to the enclosure. When latching member 122 moves away from catch 806, a sensor within latching module may detect that the latch is no longer within the predetermined proximity of the catch and cause system 100 to enter the alert state.

In the event of hardware malfunction including but not limited to badge reader issue, latch failure, and board malfunction, the user may be advised to access battery compartment 115 by removal of the battery cover, remove the batteries 117, pull down the spring loaded lever 802 with one hand or finger, and pull open the cabinet door with the other hand. In some implementations, when the batteries are removed (e.g. to gain access to lever 802), the access control assembly system 100 detects the removal of the batteries, and may flag and capture the event as an emergency access. In response, a notification may then be sent to a server, an administrator, or previously identified authorized personnel.

Figure 11:
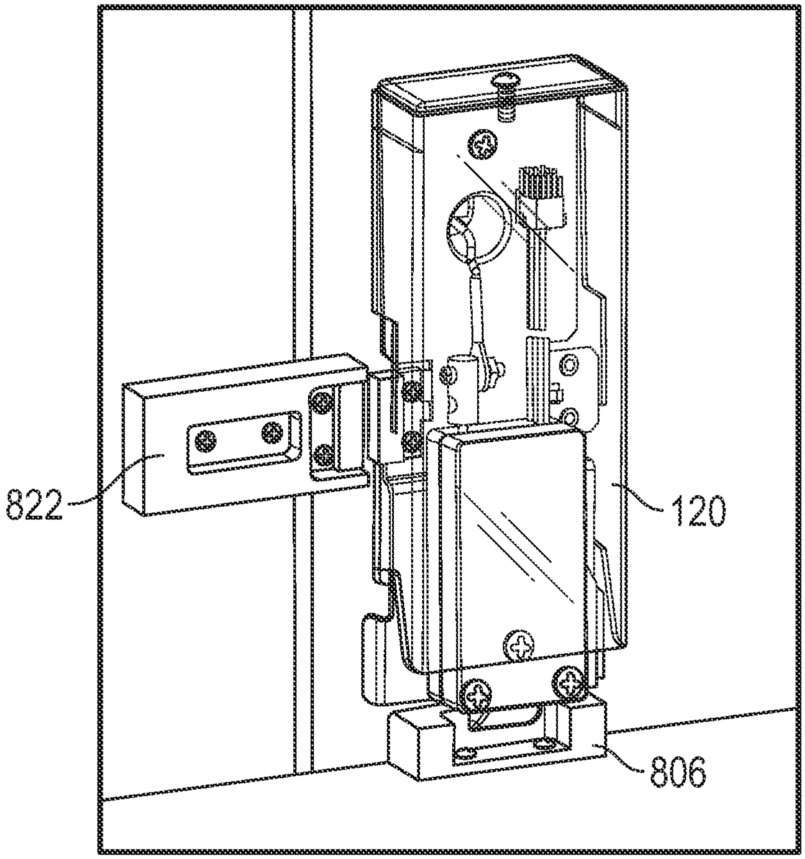
FIG. 11 depicts a rear view of an example access control assembly system, including a door sensor trigger, according to various aspects of the subject technology.

FIG. 11 depicts a rear view of an example access control assembly system, including a door sensor trigger, according to various aspects of the subject technology. The access control assembly system 100 may installed on a double door cabinet with no divider, such as the left side of cabinet 10 in FIG. 1. In this regard, a secondary sensor trigger 822 may also be installed on the passive door (opposite active door 14, that does not include interface module 110 or latching module 120) to ensure that the passive door is secured, and that access through the second door may be monitored and recorded.

The secondary door system extends past the passive cabinet door into the active door. The open/close state of the passive door is monitored by the access control assembly system. Unauthorized access and force entry via the passive door are captured and flagged. A notification is sent to IDN, admins, and authorized personnel.

The door sensor trigger 822 configured to be sensed by a door sensor within access control assembly system 100 (e.g. within interface module 110 or latching module 120) when the passive door and the access door are in the closed position. The senor (not shown) detects when door sensor trigger 882 moves away from latching module 120 thus signaling that the door has been open and/or the cabinet 10 accessed.

Figure 12:
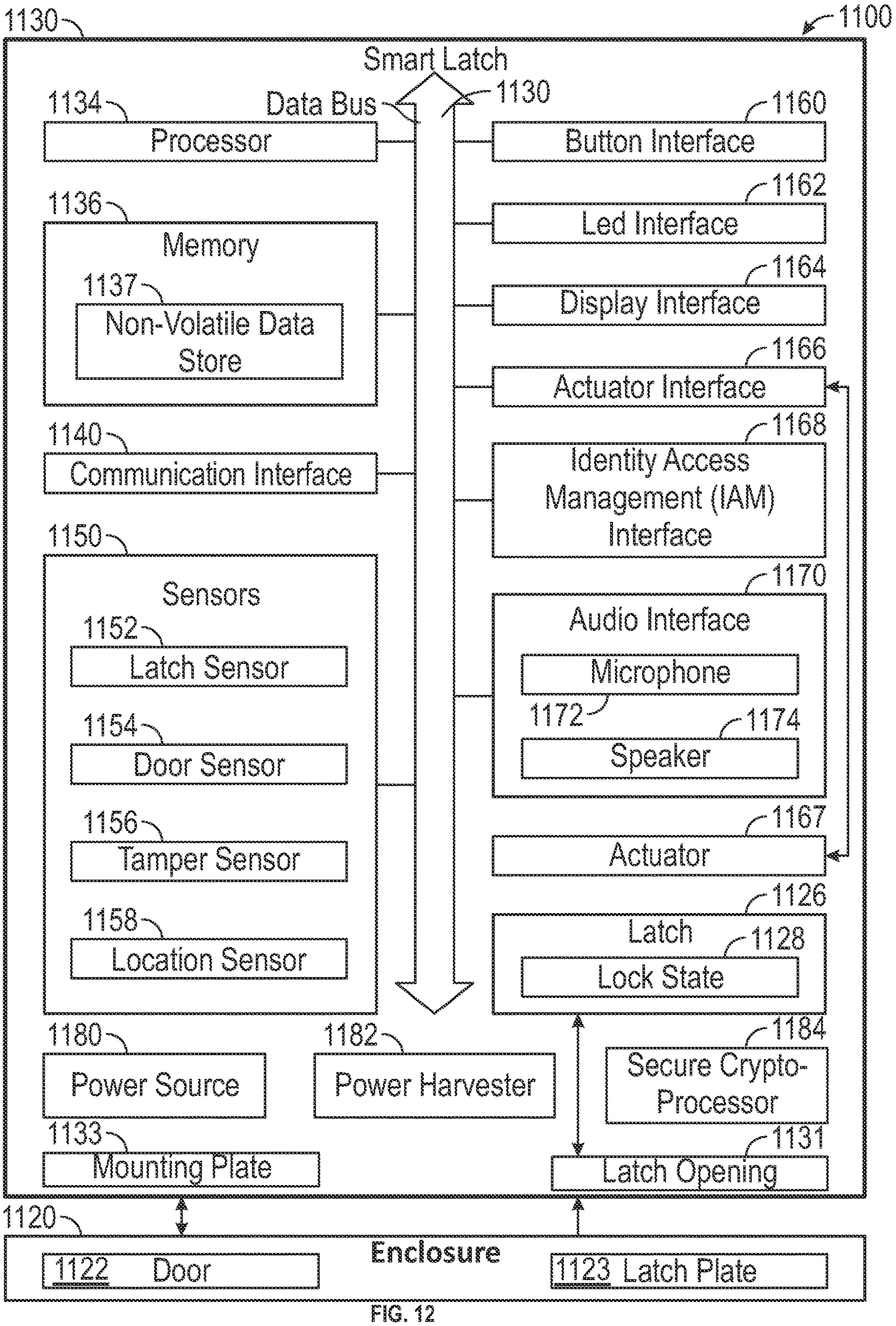
FIG. 12 depicts an example system including access control assembly to provide secure access control monitoring, according to various aspects of the subject technology.

FIG. 12 depicts an example system 1100 including access control assembly 1130 to provide secure access control monitoring, according to various aspects of the subject technology. Cabinet 1120 includes door 1122 and latch plate 1123. Access control assembly 1130 includes latch 1126, latch opening 1131, data bus 1132, mounting plate 1133, processor 1134, memory 1136, communication interface 1140, sensors 1150, button interface 1160, LED interface 1162, display interface 1164, actuator interface 1166, actuator 1167, identity access management (IAM) interface 1168, audio interface 1170, power source 1180, power harvester 1182, and secure crypto-processor 1184. Latch 1126 includes lock state 1128. Memory 1136 includes non-volatile data store 1137. Sensors 1150 may include latch sensor 1152, door sensor 1154, tamper sensor 1156, and location sensor 1158. Audio interface 1170 includes microphone 1172 and speaker 1174. The components included in access control assembly 1130 are exemplary and other implementations may include a different configuration of components according to use case requirements, power consumption targets, clinical setting, and price point constraints.

Access control assembly 1130 may include latch opening 1131, which allows latch 1126 to pass through a housing of access control assembly 1130 to attach to latch plate 1123, as illustrated in greater detail in conjunction with FIG. 9B, FIG. 9C, and FIG. 9D below. Access control assembly 1130 may include mounting plate 1133, which allows access control assembly 1130 to mechanically attach to an enclosure 1120 (e.g. cabinet 10), for example via mounting bolts.

Access control assembly 1130 may include processor 1134 (or latch controller), which may correspond to any type of general or specialized processor, controller, integrated circuit, application specific integrated circuit (ASIC), field programmable gate array (FPGA), system-on-chip, or similar device, and may include hardcoded circuit elements, firmware, software, or any combination thereof to implement one or more of the specific access control assembling features describe herein. Processor 1134 may communicate with other components of access control assembly 1130 via data bus 1132, which may comprise one or more communication buses, such as parallel or serial buses.

Access control assembly 1130 may include memory 1136, which may include volatile work memory as well as non-volatile data store 1137 for long term data storage. For example, non-volatile data storage 1137 may comprise flash memory or other memory that retains data after power source 1180 is unavailable. Non-volatile data store 1137 may include several data logs that record, for example, user authentication events, and periodic sensor data.

Communication interface 1140 may include one or more wireless radios to communicate with other devices and/or other access control assemblies. For example, communication interface 1140 may include one or more radios, scanners, or other devices that are compliant with Bluetooth, Bluetooth Low Energy, Near Field Communication (NFC), Wi-Fi, contactless Smartcards, Radio-Frequency identification, 1-D and 2-D barcodes, and other protocols.

Sensors 1150 may include one or more sensors to record, for example, conditions and evidence related to attempts to divert or tamper with the contents of enclosure 1120. For example, latch sensor 1152 may record when latch 122 is no longer is proximity to catch 806. Latch sensor 1152 may include a magnetic sensor, as previously described. Door sensor 1154 may sense when a passive door has been opened, as previously described. Tamper sensor 1156 may determine whether case intrusion has occurred, for example if retaining screws, latches, covers, or other components of access control assembly 1130 have been opened, unsealed, drilled, deformed, or otherwise tampered, or when a cover to battery compartment 115 has been accessed. For example, mechanical switches, anti-tamper films, photodiodes with reflective materials, infrared proximity sensors, and other devices may be used. Location sensor 1158 may include, for example, a global positioning system (GPS) radio to enable location history tracking. Alternatively, or additionally, in some implementations, triangulation may be used to determine location, for example by using Wi-Fi or Bluetooth triangulation using known networks and/or beacons. In combination with secure crypto-processor 1184, sensors 1150 may securely record real-time sensor data to comply with National Institutes of Standards and Technology (NIST) requirements. Sensors 1150 may include light sensor (not shown). Some items stored within the enclosure 1120 may be light sensitive. The access control assembly 1130 may assess a status of a light sensitive item based on levels recorded by sensors 1150.

Button interface 1160 may enable user input and selections on a user interface. Alternatively, or additionally, display interface 1164 may provide a touchscreen panel to accept user input. In some implementations, user input may be received from a remote device, such as a tablet or smartphone, via communication interface 1140.

Light emitting diode (LED) interface 1162 may drive one or more multi-color LEDs or organic LEDs (OLEDs) for providing a quickly identifiable status indication. For example, LEDs may be driven at varied brightness, blinking patterns, and colors to indicate various states of access control assembly 1130. In one configuration, solid red LEDs may indicate that sensors 1150 have an unauthorized access to the cabinet, a master badge 200 was used, or that catch 806 is no longer detected, whereas solid green LEDs may indicate that sensors 1150 have not recorded such indications. Blinking green LEDs may indicate that an authorized user has submitted valid credentials for unlocking latch 1126 to access the contents of enclosure 1120. Blinking red LEDs may indicate that tamper sensor 1156 and/or shock and vibration sensor 1154 have recorded an intrusion attempt, for example if a detected deformation, vibration or shock value exceeds a predetermined threshold. Blinking yellow LEDs may indicate that power source 1180 has crossed a low battery threshold and needs replacement. Blinking white LEDs may visually identify the cabinet 1120 to the user, allowing the user to readily identify cabinet 1120 associated with a requested item.

Display interface 1164 may drive a display to show various user interfaces enabling a user to quickly visualize a more detailed description of prior access times or dates or of emergency access events, to display remaining battery life, and to perform other management and status query operations. The user interfaces may utilize text and graphics such as icons, animations, and other elements. In some implementations, these user interfaces may additionally or alternatively be presented on a remote device, such as a tablet or smartphone. Display interface 1164 may drive an electronic ink (e-ink) display, a touchscreen liquid crystal display (LCD), an OLED, or another display type. The information may be presented on the display interface 1164 in human readable form (e.g., letters, numbers, or images) or machine-readable form (e.g., barcode, quick read code, standardized scan code form, or custom scan code form).

Actuator interface 1166 may trigger actuator 1167 to actuate latch 1126, thereby changing lock state 1128 from open to closed and vice versa. For example, latch 1126 may correspond to an electromechanical lock or an electromechanical latch. Actuator interface 1166 may also query latch 1126 to determine lock state 1128. In some implementations, a manual lock may be provided to manually lock and unlock latch 1126 without using actuator interface 1166. In this case, any manual locking or unlocking action may be recorded within an access log in non-volatile data store 1137. A manual lock may be useful to provide access to the contents of cabinet 1120 when access control assembly 1130 malfunctions or when power source 1180 is exhausted and no replacement is readily available. Likewise, the emergency access mechanisms previously describe allow a user to access the cabinet under the same conditions.

Identity access management (IAM) interface 1168 may include one or more devices to enable a user to provide credentials for user authentication. For example, IAM interface 1168 may include one or more biometric scanners, such as a fingerprint sensor, an iris scanner, an electrocardiogram (ECG) reader such as a smartwatch, and a depth camera for facial recognition. IAM interface 1168 may also include smartcard readers or other devices to read a contactless smartcard or other unique identifier or token. In some implementations, IAM interface 1168 may use communication interface 1140 to utilize biometric scanners or readers present on a remote device, such as a tablet or smartphone. Accordingly, IAM interface 1168 may receive user credentials which can be validated in conjunction with secure crypto-processor 1184.

When multiple authentication methods are available in IAM interface 1168, then a particular authentication method may be automatically selected for authentication. For example, the authentication methods may be sorted according to security strength, and the methods with the highest security strength may be preferred for use. In some implementations, the user may select the preferred method of authentication. Further, a super user or a user with elevated privileges may manually authenticate a user, for example if the user misplaces his credentials.

Audio interface 1170 may include one or more audio devices, such as microphone 1172 and speaker 1174. Microphone 1172 may enable voice commands to be used instead of button interface 1160 or display interface 1164. Speaker 1174 may enable audio prompts, feedback, and alerts to be emitted. Speaker 1174 may comprise a piezoelectric speaker, a dynamic speaker, or another type of speaker. For example, different tones may be emitted from the piezoelectric speaker to indicate different states or user prompts.

Power source 1180 provides electrical power for the components of access control assembly 1130. Power source 1180 may comprise a non-rechargeable battery, a rechargeable battery, a capacitor or super-capacitor, or another energy storage device. Power source 1180 may be user accessible and replaceable. To supplement or recharge power source 1180, power harvester 1182 may be used to receive power from external sources. For example, power harvester 1182 may receive wireless power through inductive coils or RF sources. Power harvester 1182 may also receive power through mechanical action, such as via piezo transducers interfaced to buttons connected to button interface 1160, or via electromagnetic induction induced by actuation movement of latch 1126. Power harvester 1182 may also receive power through direct wired connection, such as via universal serial bus (USB) charging cables, AC-DC chargers, or DC-DC chargers, which may be plugged into an external battery pack or wall mains voltage supply. In the event that power source 1180 is depleted, lock state 1128 may be maintained in its current state, whether closed or open, until power source 1180 is replaced or a manual lock is engaged, when made available.

To extend the operating time of power source 1180, various power management strategies may be utilized. For example, access control assembly 1130 may be placed in a low power or sleep state when no activity is anticipated. When activity such as user interactions, periodic network updates, or sensor logging is necessary, access control assembly 1130 may wake up to a normal operating mode, and return to the low power or sleep state once the activity is completed. The estimation of low activity may be based on network activity, user preferences, working schedules, or other factors. Access control assembly 1130 may also wake up in response to an activation word or phrase via microphone 1172, a button press on button interface 1160, or a touch input from display interface 1164. In some implementations, sensors 1150 may include occupancy sensors which may be used to determine estimated activity levels. In some implementations, microphone 1172 may be used as an occupancy sensor. In some implementations, power management may be based on machine learning algorithms, as described in further detail below in FIG. 10A.

Secure crypto-processor 1184 may correspond to a trusted platform module (TPM) chip that stores public and private encryption keys for encrypting and decrypting data. For example, the public keys may include public keys of key pairs generated by authorized users, allowing each user to submit credentials encrypted by a respective private key for decrypting by secure crypto-processor 1184. Similarly, private keys specific to access control assembly 1130 can be used to encrypt data before transmitting, storing, and exposing the data (e.g., to the outside world). In this manner, data travelling through data bus 1132 and stored in memory 1136, including non-volatile data store 1137, can be securely encrypted to protect against third party eavesdropping and modification. Encrypted data can also be more safely transmitted to the outside world, including over potentially insecure and untrusted networks.

In some implementations, a remote device such as a tablet, smartphone, laptop, or other device may be used to interface with access control assembly 1130. For example, the remote device may include an optical scanner that can read 1D or 2D barcodes and/or LED flashing patterns to receive data from access control assembly 1130. The scanner may be used, for example, to identify access control assembly 1130 for loading medications into enclosure 1120. For example, access control assembly 1130 may include an embedded unique identifier or serial number that can be transmitted using barcodes or LEDs.

The remote device may execute a local application downloaded from an application store, a corporate network, a website, or another distribution method. Alternatively, the remote device may execute a remote cloud-based application or a Software as a Service (SaaS) application. The application may allow communication with access control assemblies such as access control assembly 1130. For example, the application may utilize radios that support various protocols such as Bluetooth, Bluetooth Low Energy, Near Field Communication (NFC), Wi-Fi, contactless smartcards, Radio-Frequency identification, and others.

When the remote device is connected to a network, such as via a Wi-Fi or cellular connection, access control assembly 1130 may utilize the network to communicate and synchronize with a remote server, as described in further detail below in conjunction with FIG. 10A and FIG. 10B. Alternatively, when such a connection is not present, access control assembly 1130 may utilize mobile mesh networking to use other access control assemblies as nodes to connect to the remote server. Further, access control assembly 1130 may function as a wireless repeater to provide a network connection to smart containers within enclosure 1120 and smart devices outside of enclosure 1120. In some implementations, a cellular modem may be included within access control assembly 1130 to provide a direct cellular connection to the remote server. However, to reduce implementation complexity and data network costs, it may be preferable to omit a cellular modem.

Figure 13:
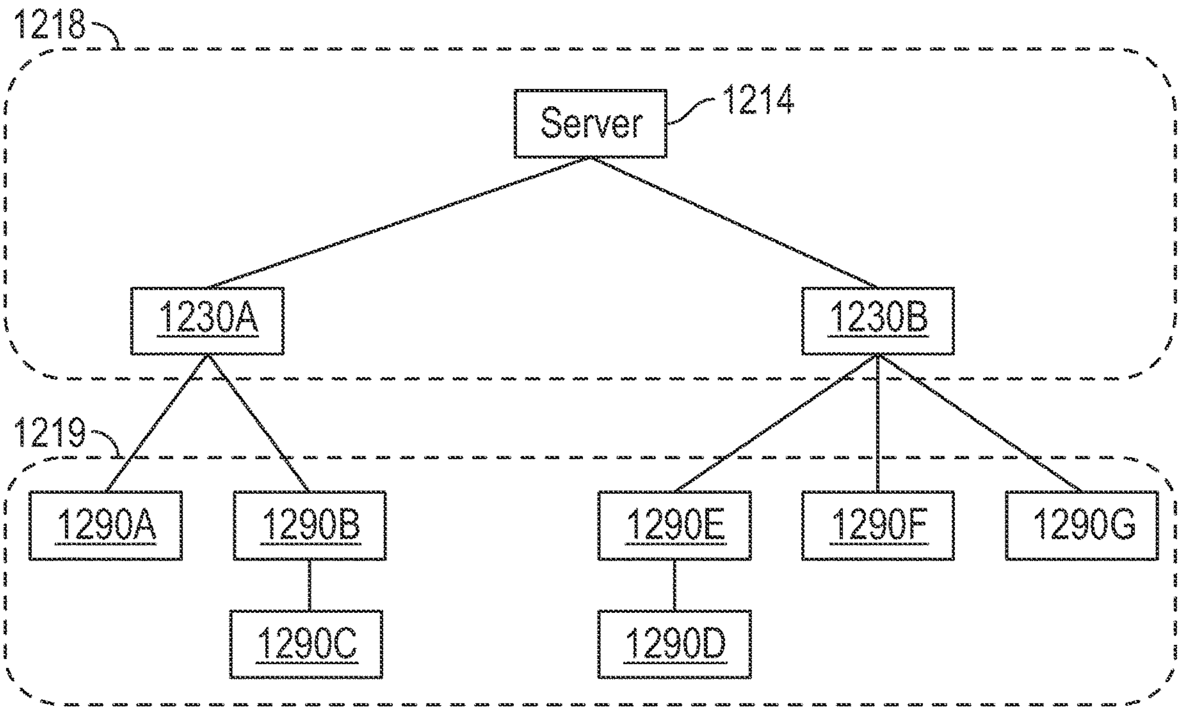
FIG. 13 depicts an example network topology diagram of access control assemblies, according to various aspects of the subject technology.

FIG. 13 depicts an example network topology diagram of access control assemblies 1290A-1290B, according to various aspects of the subject technology. Server 1214 may connect to access control assemblies 1230A and 1230B via network 1218. Access control assemblies 1230A and 1230B may connect directly to an infrastructure network of care facility 1210 having access to a public network, such as network 1218, which may comprise the Internet. In some implementations, latches 1230A and 1230B may connect to a private local area network or other network before connecting to network 1218. In some implementations, a cellular router, hub, gateway, modem, or another network device may be provided in each access control assembly 1230A and 1230B to provide a connection to network 1218. In this manner, the access control assemblies can be immediately deployed without requiring potentially costly and time consuming integration into existing information technology (IT) infrastructure at care facility 1210.

As shown in system 1200, each access control assembly 1230A and 1230B may communicate with each other, for example by providing a wireless repeater network for connecting smart devices 1290A-1290G. In this case, the access control assemblies and the smart devices may provide mobile mesh network 1219, wherein each access control assembly and smart device may function as a mesh node hop to facilitate a connection to network 1218. When a route to server 1214 is not immediately available, then a smart device may operate in an offline mode.

Each access control assembly may also support real-time status reporting when a network connection route is available. For example, a client may query server 1214 for the status of a specific access control assembly. Assuming that server 1214 can establish a network route to communicate with the requested access control assembly, the access control assembly may be queried for the requested status, such as tamper attempt history, or enclosure status, and the access control assembly may respond by sending an encrypted message containing the requested status. Global searches may also be supported to query the status of multiple access control assemblies within a network.

Network 1218 may correspond to a public network such as the Internet, and server 1214 may be connected to access control assemblies 1290A and 1190B. Mobile mesh network 1219 may correspond to an ad-hoc mobile mesh network, wherein each individual node, or smart devices 1230A-1230G may physically move and disconnect and reconnect with each other according to radio reception to form a mesh network. Access control assemblies 1230A-1230B may connect directly to server 1214 via network 1218, whereas smart devices 1290A-1290B may connect to a wireless repeater network provided by access control assembly 1290A, and smart devices 1290E-1290G may connect to a wireless repeater network provided by access control assembly 1290B. Smart devices 1290C and 1290D may connect to respective access control assemblies 1290A and 1290B using respective smart device 1290B and 1290E as an intermediary node. Thus, nodes can act as master nodes (e.g. server 1214), slave nodes (e.g. smart devices 1290A, 1290C, 1290D, 1290F, and 1290G), or hybrid master/slave nodes (e.g. access control assemblies 1230A, 1230B, and smart devices 1290B, 1290E).

Figure 14:
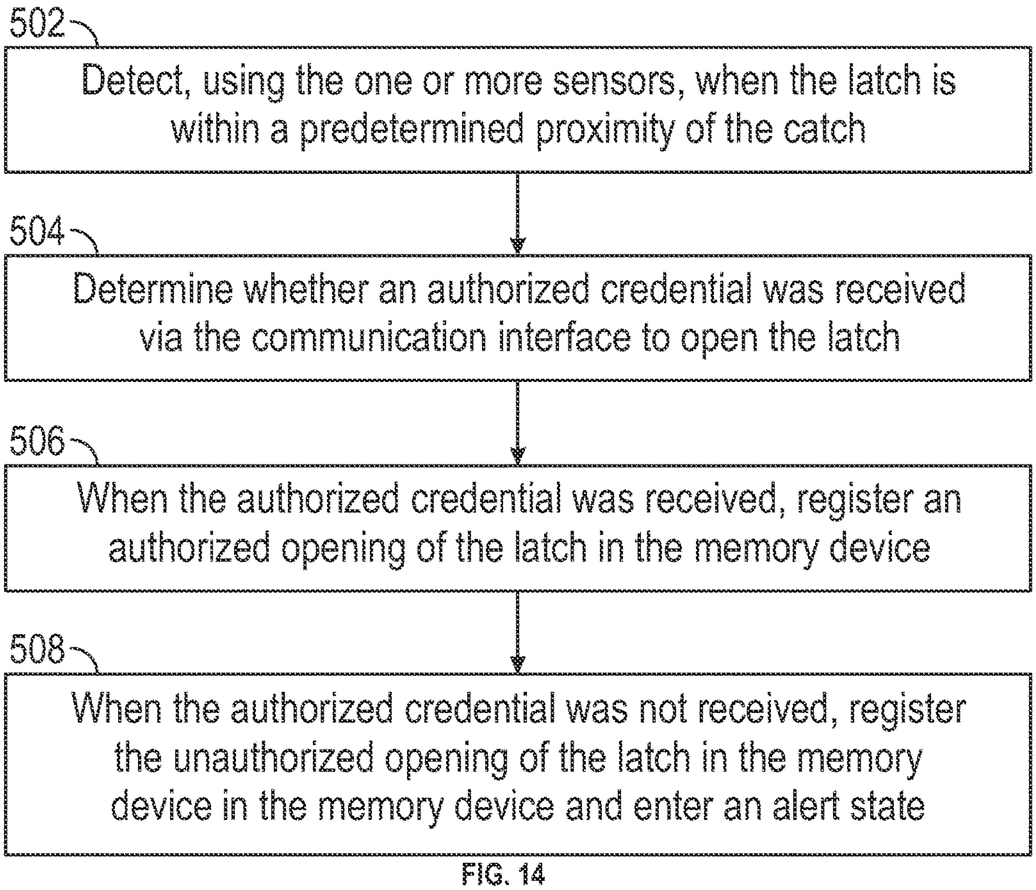
FIG. 14 depicts an example process for using a access control assembly to provide controlled emergency access to a secured enclosure, according to various aspects of the subject technology.

FIG. 14 depicts an example process 500 for using a access control assembly to provide controlled emergency access to a secured enclosure, according to various aspects of the subject technology. For explanatory purposes, the various blocks of example process 500 are described herein with reference to FIGS. 9A-11, and the components and/or processes described herein. The one or more of the blocks of process 1400 may be implemented, for example, by a computing device, including a processor and other components utilized by the device. In some implementations, one or more of the blocks may be implemented apart from other blocks, and by one or more different processors or devices. Further for explanatory purposes, the blocks of example process 1400 are described as occurring in serial, or linearly. However, multiple blocks of example process 1400 may occur in parallel. In addition, the blocks of example process 500 need not be performed in the order shown and/or one or more of the blocks of example process 500 need not be performed.

In the depicted example flow diagram, a access control assembly system 100 detects, using the one or more sensors, when a latch 122 is within a predetermined proximity of a catch 806 (502).

Responsive to detecting that the latch is not within the predetermined proximity of the catch, steps 504 to 508 are performed. The access control assembly system 100 determines whether an authorized credential was received via the communication interface to open the latch (504). When the authorized credential was received, register an authorized opening of the latch in the memory device (506). When the authorized credential was not received, register the unauthorized opening of the latch in the memory device in the memory device and enter an alert state (508).

Many aspects of the above-described example process 500, and related features and applications, may also be implemented as software processes that are specified as a set of instructions recorded on a computer readable storage medium (also referred to as computer readable medium), and may be executed automatically (e.g., without user intervention). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

The term "software" is meant to include, where appropriate, firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 15:
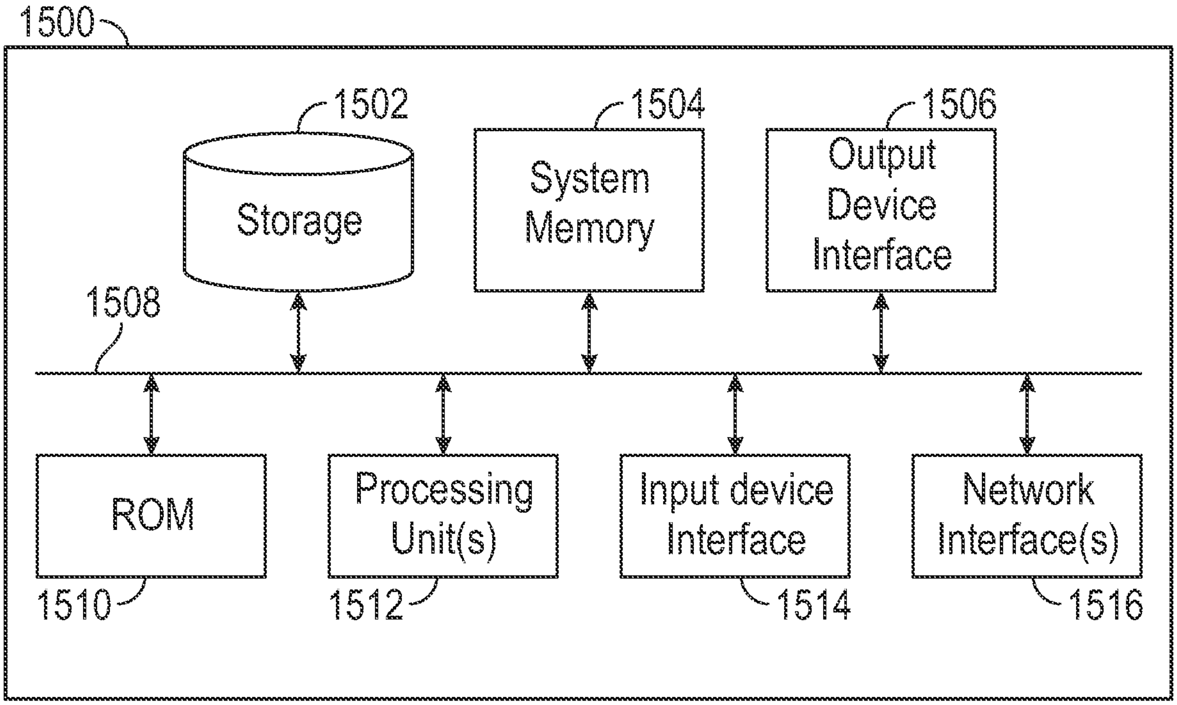
FIG. 15 is a conceptual diagram illustrating an example electronic system for operating a access control assembly for controlled emergency access to a secured enclosure, according to various aspects of the subject technology.

FIG. 15 is a conceptual diagram illustrating an example electronic system 1500 for operating a access control assembly for controlled emergency access to a secured enclosure, according to various aspects of the subject technology. Electronic system 1500 may be a computing device for execution of software associated with one or more portions or steps of process 1400, or components and processes provided by FIGS. 1 to 15. Electronic system 1500 may be representative, in combination with the disclosure regarding FIGS. 1 to 15, of the a latch controller of access control assembly 100, 1130 or other computing device associated with the latch controller or control assembly, as described above. In this regard, electronic system 1500 may be a microcomputer, personal computer or a mobile device such as a smartphone, tablet computer, laptop, PDA, an augmented reality device, a wearable such as a watch or band or glasses, or combination thereof, or other touch screen or television with one or more processors embedded therein or coupled thereto, or any other sort of computer-related electronic device having network connectivity.

Electronic system 1500 may include various types of computer readable media and interfaces for various other types of computer readable media. In the depicted example, electronic system 1500 includes a bus 1508, processing unit(s) 1512, a system memory 1504, a read-only memory (ROM) 1510, a permanent storage device 1502, an input device interface 1514, an output device interface 1506, and one or more network interfaces 1516. In some implementations, electronic system 1500 may include or be integrated with other computing devices or circuitry for operation of the various components and processes previously described.

Bus 1508 collectively represents all system, peripheral, and chipset buses that communicatively connect the numerous internal devices of electronic system 1500. For instance, bus 1508 communicatively connects processing unit(s) 1512 with ROM 1510, system memory 1504, and permanent storage device 1502.

From these various memory units, processing unit(s) 1512 retrieves instructions to execute and data to process in order to execute the processes of the subject disclosure. The processing unit(s) can be a single processor or a multi-core processor in different implementations.

ROM 1510 stores static data and instructions that are needed by processing unit(s) 1512 and other modules of the electronic system. Permanent storage device 1502, on the other hand, is a read-and-write memory device. This device is a non-volatile memory unit that stores instructions and data even when electronic system 1500 is off. Some implementations of the subject disclosure use a mass-storage device (such as a magnetic or optical disk and its corresponding disk drive) as permanent storage device 1502.

Some implementations use a removable storage device (such as a floppy disk, flash drive, and its corresponding disk drive) as permanent storage device 1502. Like permanent storage device 1502, system memory 1504 is a read-and-write memory device. However, unlike storage device 1502, system memory 1504 is a volatile read-and-write memory, such a random access memory. System memory 1504 stores some of the instructions and data that the processor needs at runtime. In some implementations, the processes of the subject disclosure are stored in system memory 1504, permanent storage device 1502, and/or ROM 1510. From these various memory units, processing unit(s) 1512 retrieves instructions to execute and data to process in order to execute the processes of some implementations.

Bus 1508 also connects to input and output device interfaces 1514 and 1506. Input device interface 1514 enables the user to communicate information and select commands to the electronic system. Input devices used with input device interface 1514 include, e.g., alphanumeric keyboards and pointing devices (also called "cursor control devices"). Output device interfaces 1506 enables, e.g., the display of images generated by the electronic system 1500. Output devices used with output device interface 1506 include, e.g., printers and display devices, such as cathode ray tubes (CRT) or liquid crystal displays (LCD). Some implementations include devices such as a touchscreen that functions as both input and output devices.

Also, bus 1508 also couples electronic system 1500 to a network (not shown) through network interfaces 1516. Network interfaces 1516 may include, e.g., a wireless access point (e.g., Bluetooth or WiFi) or radio circuitry for connecting to a wireless access point. Network interfaces 1516 may also include hardware (e.g., Ethernet hardware) for connecting the computer to a part of a network of computers such as a local area network ("LAN"), a wide area network ("WAN"), wireless LAN, or an Intranet, or a network of networks, such as the Internet. Any or all components of electronic system 1500 can be used in conjunction with the subject disclosure.

The subject technology provides secure access control monitoring of medicine and healthcare items stored within enclosures in clinical settings. A method includes providing a access control assembly for attaching to the enclosure. The method also includes receiving a user credential for accessing the enclosure. The method also includes validating the user credential for accessing the enclosure. The method also includes triggering an actuator to open a latch, thereby allowing a door of the enclosure to be opened. The method also includes triggering the actuator to close the latch after detecting that the door is closed, thereby securing the door.

One or more aspects or features of the subject matter described herein may be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one specifically configured programmable processor, which may be special or general purpose, coupled to receive data and specific instructions from, and to transmit data and instructions to, a storage system, at least one input device, and at least one output device. The programmable system or computing system may include one or more clients and/or servers. A client and server are generally remote from each other and typically interact through a communication network. The relationship of client and server arises by virtue of computer programs running on the respective computers and having a client-server relationship to each other.

These specific computer programs, which can also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer," "server," "processor," and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Illustration of Subject Technology as Clauses:

Various examples of aspects of the disclosure are described as numbered clauses (1, 2, 3, etc.) for convenience. These are provided as examples, and do not limit the subject technology. Identifications of the figures and reference numbers are provided below merely as examples and for illustrative purposes, and the clauses are not limited by those identification.

Clause 1. A access control system, comprising: a catch configured to be affixed to an inner portion of an enclosure; a latch configured to engage the catch when the catch is attached to the enclosure and an access door of the enclosure is in a closed position, wherein the latch engaging the catch secures the access door of the enclosure in a locked state; a latch controller; a memory device; one or more sensors configured to monitor the catch; an actuator configured to electronically open the latch to open the access door of the enclosure; a credential interface configured to receive an electronically provided credential; and a communication interface configured to communicate with a server over an electronic network, wherein the latch controller is configured to: detect, using the one or more sensors, when the latch is within a predetermined proximity of the catch; and responsive to detecting that the latch is not within the predetermined proximity of the catch: determine whether an authorized credential was received via the communication interface to open the latch; when the authorized credential was received, register an authorized opening of the latch in the memory device; and when the authorized credential was not received, register the unauthorized opening of the latch in the memory device in the memory device and enter an alert state.

Clause 2. The system of Clause 1, wherein the one or more sensors comprise a magnetic sensor configured to detect a ferrous or magnetic object, and wherein the catch comprises a ferrous or magnetic object embedded therein.

Clause 3. The system of Clause 1 or Clause 2, wherein the catch comprises a plurality of slits and the ferrous or magnetic object is embedded within one of the slits and wherein the latch comprises a plurality of teeth that engage within the plurality of slits to engage the catch.

Clause 4. The system of any one of Clause 1 through 3, wherein catch comprises an anchor portion configured to be affixed to the inner portion of the enclosure and a breakaway portion configured to interface with the latch to secure the access door of the enclosure in the locked state, the system further comprising: a housing comprising at least the one or more sensors and the memory device; and an emergency access portal through a portion of the housing, the emergency access portal providing access by an instrument to the catch to detach the breakaway portion from the anchor portion, wherein detaching the breakaway portion from the anchor portion releases access door to provide access to the enclosure and triggers the one or more sensors to detect that the latch is no longer within the predetermined proximity of the catch.

Clause 5. The system of Clause 4, wherein the housing comprises a battery compartment and the emergency access portal is within the battery compartment.

Clause 6. The system of Clause 5, wherein one or more sensors is configured to detect removal of one or more batteries from the battery compartment, and wherein the latch controller is further configured to, when the one or more batteries are removed, register the access to the battery compartment in the memory device and enter the alert state.

Clause 7. The system of any one of Clause 1 through 6, the system further comprising: a housing comprising at least the one or more sensors and the memory device; and an emergency access portal through a portion of the housing, the emergency access portal providing access to a mechanical lift configured to manually move the latch away from the catch and release the access door to provide access to the enclosure and trigger the one or more sensors to detect that the latch is no longer within the predetermined proximity of the catch.

Clause 8. The system of Clause 7, wherein the housing comprises a battery compartment and the emergency access portal is within the battery compartment.

Clause 9. The system of any one of Clause 1 through 8, further comprising: a housing containing at least the one or more sensors and the memory device, and comprising an visual element on a exterior of the housing, wherein entering the alert state comprises causing the visual element to display an alert indicator.

Clause 10. The system of any one of Clause 1 through 9, the latch controller is further configured to: provide the record of the alert state to the server at a next time the communication interface communicates with the server.

Clause 11. The system of any one of Clause 1 through 6 or Clause 10, further comprising: a housing comprising at least the one or more sensors and the memory device; and a door sensor trigger configured to be mounted to a passive door of the enclosure, the door sensor trigger configured to be sensed by the one or more sensors when the passive door and the access door are in the closed position, wherein detecting, using the one or more sensors, when the latch is within a predetermined proximity of the catch comprises the one or more sensors no longer sensing the door sensor trigger.

Clause 12. A access control assembly attachable to a door of an enclosure, the access control assembly comprising: a latch configured to engage a catch affixed to an inner portion of the enclosure when the access control assembly is attached to the door of the enclosure, wherein the latch engaging the catch secures the door in a locked state; an actuator configured to electronically open the latch to open the door of the enclosure; a latch controller; a credential interface configured to receive an electronically provided access credential; a communication interface configured to communicate with a server over an electronic network; and wherein the latch controller is configured with instructions to: receive the access credential from the communication interface; responsive to receiving the access credential: store an indication of the access credential in the memory device; query the server over the electronic network as to whether the access credential is authorized to access the enclosure; trigger the actuator to open the latch when the server indicates the access credential is authorized to access the enclosure; and when the server indicates the credential is not authorized to access the enclosure or when the communication interface is unable to communicate with the server to authorize the credential: require a secondary credential to access the enclosure; receive the secondary credential to access the enclosure; trigger the actuator to open the latch based on receiving the secondary credential; store, in the memory device, a record of the latch being opened together with the secondary credential; and provide the record to the server at a next time the communication interface communicates with the server.

Clause 13. The access control assembly of Clause 12, wherein when the server indicates the credential is not authorized to access the enclosure or when the communication interface is unable to communicate with the server to authorize the credential: requiring the access credential to obtain an identity of a user before the actuator is triggered to open the latch based on receiving the secondary credential; and storing the identity of the user in the record before providing the record to the server.

Clause 14. The access control assembly of Clause 12 or Clause 13, wherein the access control assembly further comprises: a housing comprising a visual element on an exterior of the housing, wherein the latch controller is further configured to, when the latch is triggered based on receiving the secondary credential, cause the visual element to display an alert indicator.

Clause 15. The access control assembly of Clause 14, wherein the access control assembly is further configured to, when the latch is triggered based on receiving the secondary credential, provide the record of an alert state to the server at a next time the communication interface communicates with the server.

Further Consideration:

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit this disclosure.

The term website, as used herein, may include any aspect of a website, including one or more web pages, one or more servers used to host or store web related content, etc. Accordingly, the term website may be used interchangeably with the terms web page and server. The predicate words "configured to," "operable to," and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "implementation" does not imply that such implementation is essential to the subject technology or that such implementation applies to all configurations of the subject technology. A disclosure relating to an implementation may apply to all implementations, or one or more implementations. An implementation may provide one or more examples. A phrase such as an "implementation" may refer to one or more implementations and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. "Determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

In any embodiment, data generated or detected can be forwarded to a "remote" device or location, where "remote," means a location or device other than the location or device at which the program is executed. For example, a remote location could be another location (e.g., office, lab, etc.) in the same city, another location in a different city, another location in a different state, another location in a different country, etc. As such, when one item is indicated as being "remote" from another, what is meant is that the two items can be in the same room but separated, or at least in different rooms or different buildings, and can be at least one mile, ten miles, or at least one hundred miles apart. "Communicating" information references transmitting the data representing that information as electrical signals over a suitable communication channel (e.g., a private or public network). "Forwarding" an item refers to any means of getting that item from one location to the next, whether by physically transporting that item or otherwise (where that is possible) and includes, at least in the case of data, physically transporting a medium carrying the data or communicating the data. Examples of communicating media include radio or infra-red transmission channels as well as a network connection to another computer or networked device, and the internet or including email transmissions and information recorded on websites and the like.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed is:

1. A access control system, comprising:

a catch configured to be affixed to an inner portion of an enclosure;

a latch configured to be affixed to an inner portion of an access door of the enclosure and to engage the catch when the catch is attached to the inner portion of the enclosure and the access door is in a closed position, wherein the latch engaging the catch secures the access door of the enclosure in a locked state;

a housing configured to be affixed to an outer portion of the access door opposite the latch, the housing comprising:

a memory device;

a latch controller configured to detect when the latch is no longer within a predetermined proximity of the catch; and an emergency access portal aligned with and providing access through the access door by an instrument to at least the catch to engage the catch, wherein engaging the catch with the instrument releases the access door to provide access to the enclosure and triggers the latch controller to detect that the latch is no longer within the predetermined proximity of the catch, and to register an opening of the latch in the memory device.

2. The access control system of claim 1, wherein the catch comprises an anchor portion configured to be affixed to the inner portion of the enclosure and a breakaway portion removably coupled to the anchor portion;

wherein the latch is configured to engage at least the breakaway portion of the catch when the catch is attached to the enclosure and the access door is in a closed position, and the latch engaging the breakaway portion of the catch secures the access door of the enclosure in a locked state;

wherein the emergency access portal aligned with and providing access through the access door by an instrument to the breakaway portion of the catch to detach the breakaway portion from the anchor portion, wherein detaching the breakaway portion from the anchor portion releases the access door to provide access to the enclosure and triggers the latch controller to detect that the latch is no longer within the predetermined proximity of the catch.

3. The access control system of claim 1, wherein the emergency access portal provides access to a mechanical lift configured to manually move the latch away from the catch and release the access door to provide access to the enclosure and trigger the latch controller to detect that the latch is no longer within the predetermined proximity of the catch.

4. The access control system of claim 1, further comprising:

an actuator controlled by the latch controller and configured to electronically open the latch to open the access door of the enclosure;

a credential interface configured to receive an electronically provided credential; and wherein the latch controller is configured to: determine whether the electronically provided credential from the credential interface is an authorized credential and cause, responsive to the electronically provided credential being an authorized credential, cause the actuator to electronically open the latch.

5. The access control system of claim 1, wherein the latch controller is further configured to:

detect, using one or more sensors, when the latch is within a predetermined proximity of the catch; and responsive to detecting that the latch is not within the predetermined proximity of the catch:

determine whether an authorized credential was received to open the latch;

when the authorized credential was received, register an authorized opening of the latch in the memory device; and when the authorized credential was not received, register an unauthorized opening of the latch in the memory device in the memory device and enter an alert state.

6. The access control system of claim 5, wherein the one or more sensors comprise a magnetic sensor configured to detect a ferrous or magnetic object, and wherein the catch comprises a ferrous or magnetic object embedded therein.

7. The access control system of claim 6, wherein the catch comprises a plurality of slits and the ferrous or magnetic object is embedded within one of the slits and wherein the latch comprises a plurality of teeth that engage within the plurality of slits to engage the catch.

8. The access control system of claim 1, wherein the housing comprises a battery compartment and the emergency access portal is within the battery compartment.

9. The access control system of claim 8, wherein the latch controller is further configured to:

detect removal of one or more batteries from the battery compartment, and register, responsive to the one or more batteries being removed, an access to the battery compartment in the memory device.

10. The access control system of claim 9, wherein the housing comprises a battery compartment and the emergency access portal is within the battery compartment.

11. The access control system of claim 1, further comprising:

a visual element on an exterior of the housing, wherein engaging the catch with the instrument causes the visual element to display an alert indicator.

12. The access control system of claim 11, further comprising:

a communication interface configured to communicate with a server over an electronic network, wherein the latch controller is further configured to notify the server of an opening of the latch at a next time the communication interface communicates with the server.

13. A access control assembly attachable to an access door of an enclosure, the access control assembly comprising:

a latch configured to be affixed to an inner portion of the access door and to engage a catch attached to an inner portion of the enclosure when the access door is in a closed position, wherein the latch engaging the catch secures the access door of the enclosure in a locked state;

an actuator configured to electronically open the latch to open the access door of the enclosure; and a housing configured to be affixed to an outer portion of the access door opposite the latch, the housing comprising:

a memory device;

a latch controller configured to detect when the latch is no longer within a predetermined proximity of the catch; and an emergency access portal aligned with and providing access through the access door by an instrument to at least the catch to engage the catch, wherein engaging the catch with the instrument releases the access door to provide access to the enclosure and triggers the latch controller to detect that the latch is no longer within the predetermined proximity of the catch, and to register the opening of the latch in the memory device.

14. The access control assembly of claim 13, wherein the latch is configured to engage at least a breakaway portion of the catch when the catch is attached to the enclosure and the access door is in a closed position, and the latch engaging the breakaway portion of the catch secures the access door of the enclosure in a locked state;

wherein the emergency access portal aligned with and providing access through the access door by an instrument to the breakaway portion of the catch to detach the breakaway portion from an anchor portion of the catch, wherein detaching the breakaway portion from the anchor portion releases the access door to provide access to the enclosure and triggers the latch controller to detect that the latch is no longer within the predetermined proximity of the catch.

15. The access control assembly of claim 13, wherein the emergency access portal provides access to a mechanical lift configured to manually move the latch away from the catch and release the access door to provide access to the enclosure and trigger the latch controller to detect that the latch is no longer within the predetermined proximity of the catch.

16. The access control assembly of claim 13, wherein the housing further comprises a credential interface configured to receive an electronically provided credential; and wherein the latch controller is configured to:

determine whether the electronically provided credential from the credential interface is an authorized credential; and cause, responsive to the electronically provided credential being an authorized credential, cause the actuator to electronically open the latch.

17. The access control assembly of claim 13, wherein the latch controller is further configured to:

detect, using one or more sensors, when the latch is within a predetermined proximity of the catch; and responsive to detecting that the latch is not within the predetermined proximity of the catch:

determine whether an authorized credential was received to open the latch;

when the authorized credential was received, register an authorized opening of the latch in the memory device; and when the authorized credential was not received, register an unauthorized opening of the latch in the memory device in the memory device and enter an alert state.

18. The access control assembly of claim 17, wherein the one or more sensors comprise a magnetic sensor configured to detect a ferrous or magnetic object, and wherein the catch comprises a ferrous or magnetic object embedded therein.

19. The access control assembly of claim 13, wherein the housing comprises a battery compartment and the emergency access portal is within the battery compartment, wherein the latch controller is further configured to:

detect removal of one or more batteries from the battery compartment, and register, responsive to the one or more batteries being removed, an access to the battery compartment in the memory device.

20. A method, comprising:

providing a catch configured to be affixed to an inner portion of an enclosure, wherein the catch comprises an anchor portion configured to be affixed to the inner portion of the enclosure and a breakaway portion removably coupled to the anchor portion;

providing a latch configured to be affixed to an inner portion of an access door of the enclosure and to engage at least the breakaway portion of the catch when the catch is attached to the enclosure and the access door is in a closed position, wherein the latch engaging the breakaway portion of the catch secures the access door of the enclosure in a locked state;

providing an actuator configured to electronically open the latch to open the access door of the enclosure; and providing a housing configured to be affixed to an outer portion of the access door opposite the latch, the housing comprising:

a memory device;

a latch controller configured to detect when the latch is no longer within a predetermined proximity of the catch; and an emergency access portal aligned with and providing access through the access door by an instrument to the breakaway portion of the catch to detach the breakaway portion from the anchor portion, wherein detaching the breakaway portion from the anchor portion releases the access door to provide access to the enclosure and triggers the latch controller to detect that the latch is no longer within the predetermined proximity of the catch.

* * * * *